June 9, 1925. 1,541,378
J. PARCELL
CONFECTION APPARATUS
Filed Feb. 16, 1924 2 Sheets-Sheet 2
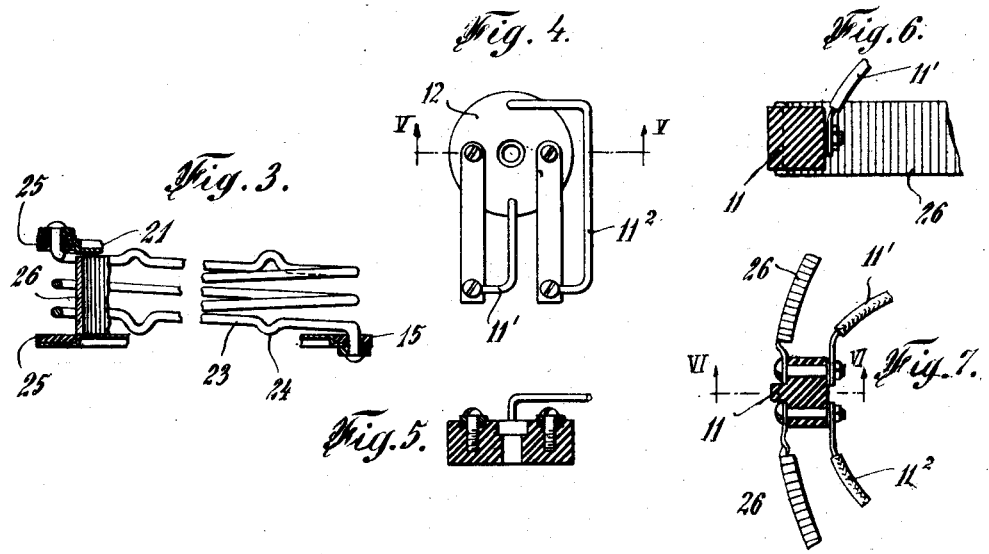
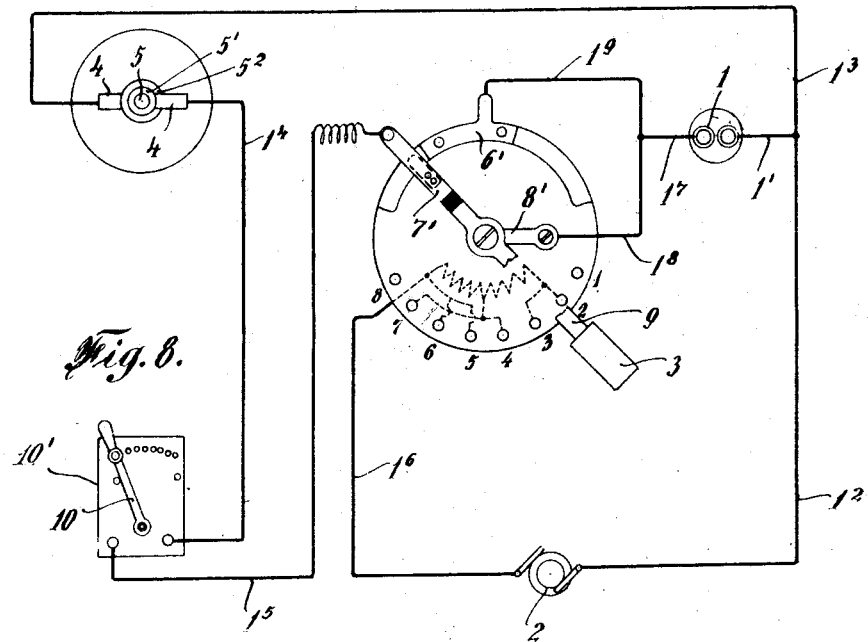
INVENTOR
John Parcell
BY J. O. Fowler
ATTORNEY Patented June 9, 1925.

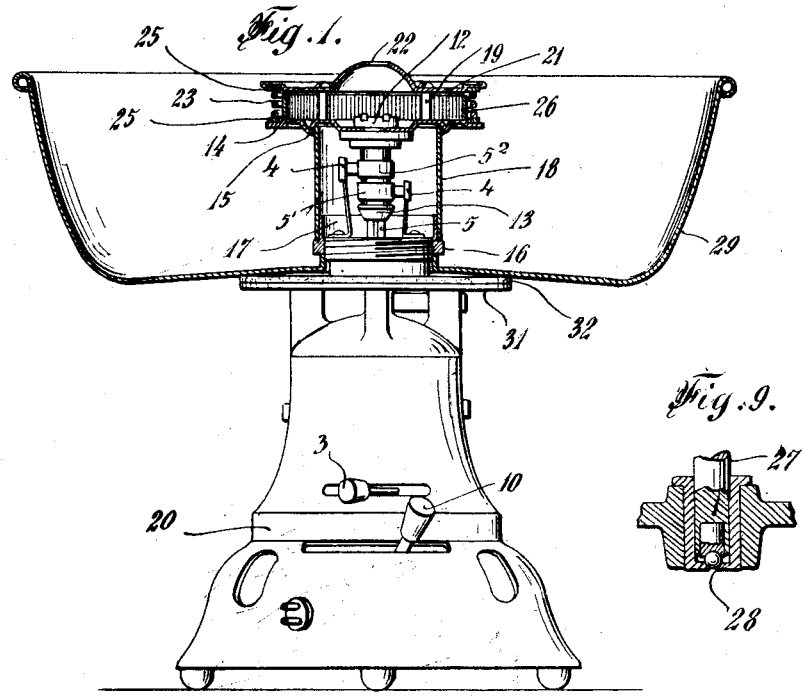
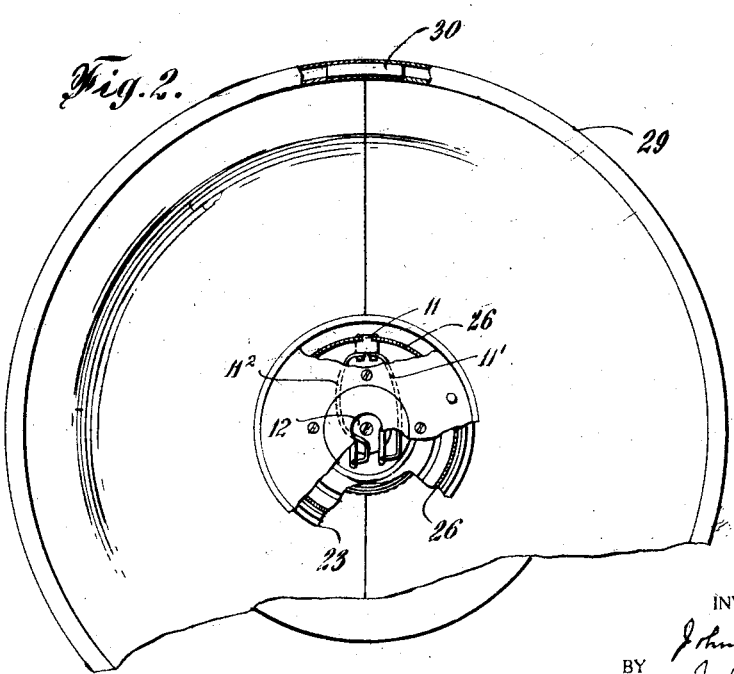

1,541,378

UNITED STATES PATENT OFFICE.

JOHN PARCELL, OF NEW YORK, N. Y.

CONFECTION APPARATUS.

Application filed February 16, 1924. Serial No. 693,231.

*To all whom it may concern:*

Be it known that I, JOHN PARCELL, a citizen of the United States, and resident of New York, in the county of New York and State of New York, have invented a certain new and useful Confection Apparatus, of which the following is a specification, the same being a full, clear, and exact description of the invention, such as will enable others skilled in the art to which it appertains to make and use the same.

This invention relates to candy making apparatus and particularly to machines adapted to rapidly convert ordinary granulated sugar into fine threads or strands of candy and comprises means whereby the operation of the same will ensure the uniformity and fineness of the product.

One object of the invention is to provide a rotary vessel containing sugar and also means to melt the latter and to eject it in finely attenuated threads of spun sugar candy.

Another object of the invention is to provide means for keeping the sugar at a uniform degree of heat to prevent the burning or overheating thereof.

Another object of the invention is the provision of a heating ribbon comprising sections adapted to prevent the escape of the unmelted sugar therefrom and to strain the discharged melted sugar.

Another object of the invention is to provide means to prevent the heating of the sugar until the motor actuating the container thereof is operated.

Another object of the invention is to provide means to vary the degree of heat given out by the heating medium without affecting the power circuit.

Another object of the invention is the provision of means for discharging the melted sugar by centrifugal force through narrow interstices of the container thereof to produce floss candy.

Another object of the invention is to provide means whereby electric current may be supplied first to the power circuit, then to both the power and heating circuits and finally to the power circuit alone, through the agency of a single switch.

A still further object of the invention is the provision of means electrically operated to rotate a vessel containing a substance to be melted, and means to protect the electric mechanism from contact with the material ejected from the vessel.

Another object of the invention is the provision of apparatus and actuating means therefor which shall be simple in construction, inexpensive to manufacture, efficient in operation and durable in practical use.

With these objects of the invention, and other objects and purposes, which will be described below, in view, the invention consists in the construction, arrangement, combination and operation of parts hereinafter set forth.

In the drawings, illustrative of one embodiment of the invention, which accompany and form a part of this specification, Figure 1 represents an elevation partly in section of an apparatus constructed according to my invention; Figure 2 is a plan view of the same; Figures 3, 4, 5, 6 and 7 are views in detail of my heating ribbon and connections; Figure 8 is a diagrammatic view of the electric circuits employed by me; and Figure 9 is a detail view of my ball bearing motor shaft support.

Referring more in detail to the drawings the reference numeral 1 denotes a pedestal or base preferably having rubber feet and containing in the interior thereof a rheostat and an electric motor of suitable and desired description (not shown), the latter as well as my heating medium—in the present instance a metal ribbon—being actuated by a switch, the handle 3 thereof projecting through the shell of said base. The handle 10 of a rheostat 10' electrically connected with my heating device also extending through the said shell.

The upper end of the shaft 27 of the motor carries spring fingers 5 which are clamped by the inverted cone shaped lower part of a cylinder 13 supporting insulated rings 5', 5² contacting the brushes 4, the upper portion of which cylinder supports the bottom 14 of my spinning vessel or bowl. Above the said bottom is positioned an insulating disk 12 carrying plates attached to wires 11', 11² which are respectively connected with the rings 5', 5², the disk 12, cylinder 13 and bottom 14 being rigidly attached together so as to rotate in unison when the motor is in operation.

The top of the base 20 is threaded to which is secured a nut 16 having an outer shouldered portion and an inner vertical flange 17. A tubular casing 18 encircles the flange 17 and rests on the shoulder of the nut 17, the top of the said casing fitting under a depending V-shaped groove of the said bottom 14, whereby a closed chamber is formed preventing any extraneous matter—as the melted sugar strips—from entering the same and interfering with the proper contact of the brushes and contacting rings.

The top 21 of the containing vessel or spinning bowl may have a centre portion of cone shape and an opening or hopper 22, and it is securely fastened to the bottom 14 by posts or bolts 19. Attached respectively to the top and bottom of the bowl is a vertical helically wound wire 25 the strands of which are spaced by V-shaped projections 24 in the same. This wire ring is covered with insulating enamel and is also insulated from the top and bottom plates 14 and 21 by insulating strips 25 preferably in the form of rings.

Inside of said ring I place a sectional band of flat metal cut in narrow strip form which metal strip is made by being wound so as to have two parallel flat side faces and curved at the top and bottom of the loops so formed, and the adjacent convolutions almost touching each other and providing an interior flattened tubular channel. This band—constituting my heating medium or ribbon—is made from metal having high electrical resistance so that when it is in circuit heat will be generated therethrough. The ends of said band are respectively connected with the wires 11' and 11² which are electrically connected with the rings 5', 5².

The lower end of the armature shaft 27 may work on a ball bearing of any suitable and desired description. The plates attached to the wires 11', 11² extending away from the centre of the spinning bowl serve as a counterbalance to the blocks 11 diametrically opposite the same.

I provide a pan or receptacle for containing the spun candy preferably made in two parts so as to be collapsible, the said parts being held together when in use by means of a pin 30 and also by the nut 16 which rigidly holds the vertical rim 29' of the bottom of the pan 29 in operative position. Near the upper part of the base is a rim 31 which may be covered with a cushioning device, as felt 32, on which the pan 29 rests.

In Figure 8 the electric circuits used by me are diagrammatically represented. When the handle 3 is moved to the posts 1 or 8 the electric motor 2 will be inoperative as it is de-energized. Upon the said handle being moved so that its stem 9 will contact the buttons 2 or 3 the power circuit current will flow through the wires 1⁷, 1⁸, plate 8, through a part of the resistance 33 to the wires 1⁶, 1² and 1' and the motor will rotate at a comparatively slow speed. When the stem 9 contacts either of the buttons 4 or 7—the wires attached to which are tapped off from the said resistance—the motor will work faster on account of the decreased now in the circuit, and upon the stem 9 contacting either of the buttons 5 or 6 the motor will run at full speed on account of there being no resistance in these circuits.

I also utilize the switch 10 to control my heating medium in the following manner: When the insulated plate 7 (so far as the handle 3 is concerned) is moved by said handle so as to be in contact with the arc shaped conducting plate 6—which occurs when the stem 9 contacts either of the buttons 3, 4 or 5—the heating circuit will become energized and the current will flow through the wires 1⁷, 1⁹, plates 6 and 7 and wires 1⁵, 1⁴, 1³ and 1'—the brushes 4 and rings 5' and 5², wires 11' and 11² and heating medium 26 being in the same circuit, (the amount of heat generated being controlled by the manipulation of the handle 10 of the rheostat 10'), thus cutting the heater into parallel circuit with the motor circuit.

It will thus be seen that the heating operation cannot be set up until after the motor has started to run, and also that the said heating operation must be concluded before the motor ceases to rotate. Furthermore when the heating operation is in force the motor is running at its highest rate of speed, as it rotates more slowly when the stem 9 contacts the outer buttons 2, 3 and 7. Also according to my invention it is possible to vary the degree of heat given out by the heating medium without affecting the power circuit.

The heating ribbon 26 also serves for a double purpose, 1st, as a heating medium, and 2nd, as a strainer, as the melted sugar is ejected through the interstices between the adjacent coils of the same in very thin strips which are caught, cooled and retained in the pan 29. By the manipulation of the rheostat 10' the sugar in the spinning bowl may be maintained at a temperature slightly above the melting point of the sugar whereby the threads or strands are ejected from the container by centrifugal force having the desired uniform fineness and without danger of burning the same or of causing the syrup to turn to caramel thus clogging up the interstices between the coils of the heating ribbon and impairing the efficiency of the apparatus.

When the melted sugar is kept at the desired temperature the whirling motion of the spinning bowl spreads the syrup on the inner face of the ribbon strainer in a film and will force the syrup through the small openings of the adjacent coils of the ribbon thus causing the melted sugar to be ejected in fine threads or strands as it is thrown off.

Inasmuch as the heating current must be opened before the motor ceases its rotation it is manifest that in such a case the spinning bowl may be placed in position without causing a short circuit occurring at the brushes and blowing out a fuse.

I wish it to be understood that I do not desire to be limited to the particular use or the exact details of construction shown and described, for obvious modifications will occur to persons skilled in the art.

What I claim as my invention is:—

1. In a machine of the class described, the combination with a power circuit and a heating circuit, of a single controlling switch therefor having a series of contacts and at one contact assuming a position whereby at first both circuits are interrupted; at additional contacts assuming other positions whereby the power circuit is closed and continuously and progressively energized; at another contact assuming another position whereby at a predetermined point the heating circuit will be closed and both circuits will receive the maximum charge of the currents controlled by the switch; and at other contacts assuming other positions by which the heating circuit is opened and the power circuit is continuously and decreasingly energized and finally opened.

2. In a candy spinner, the combination with the driving motor and the heater, of a single means for first continuously and progressively turning the current on the motor alone and at a predetermined point also turning the current on the heater, and finally de-energizing the heater and continuously and decreasingly turning the current off from the motor.

3. In a candy spinner, the combination with the driving motor located on a power circuit and the heater in parallel circuit therewith, of a single switch having a series of contacts and connections for first continuously and progressively turning the current on the motor by some of said contacts and at a predetermined point by other contacts turning the current on the heater, and finally de-energizing the heater and continuously and decreasingly turning the current off from the motor.

4. In a candy spinner, the combination with the driving motor and the heater, of a single switch having a series of contacts, one portion of which switch serving to first continuously and progressively turn the current on the heater and another part of the switch at a predetermined point serving to also turn the current on the heater, and the switch finally serving to de-energizing the heater and continuously and decreasingly turning the current off from the motor.

5. In a machine of the class described, the combination with a spinner head and a driving motor and a heater and with contact supports and contacts for the latter and a protecting guard for the same intermediate the spinner head and the contact supports, of a single means for the first continuously and progressively turning the current on the motor and at a predetermined point also turning the current on the heater contacts, and finally de-energizing the heater and continuously and decreasingly turning the current off from the motor.

6. In a candy spinner, the combination with the driving motor located on a power circuit and the heater in parallel circuit therewith, of a single switch and connections for first continuously and progressively turning the current on the motor and at predetermined points twice increasing the speed of rotation of the motor and turning the current on the heater, and finally de-energizing the heater and continuously and decreasingly with three changes of speed turning the current off from the motor, and also of means to vary the degree of heat given out by the heater without affecting the power circuit.

Signed at New York, in the county of New York and State of New York, this 8th day of February A. D. 1924.

JOHN PARCELL.